(12) United States Patent
Swanson et al.

(10) Patent No.: US 9,589,334 B2
(45) Date of Patent: Mar. 7, 2017

(54) AUTOMATED TONAL BALANCING

(71) Applicant: DigitalGlobe, Inc., Longmont, CO (US)

(72) Inventors: Nathan Reid Swanson, Erie, CO (US); Patrick Young, Denver, CO (US); Spencer Stirling, Thornton, CO (US)

(73) Assignee: DigitalGlobe, Inc., Longmont, CO (US)

( * ) Notice: Subject to any disclaimer, the term of this patent is extended or adjusted under 35 U.S.C. 154(b) by 0 days.

(21) Appl. No.: 14/708,129

(22) Filed: May 8, 2015

(65) Prior Publication Data
US 2015/0324988 A1    Nov. 12, 2015

Related U.S. Application Data

(60) Provisional application No. 61/990,110, filed on May 8, 2014.

(51) Int. Cl.
| | |
|---|---|
| *G06K 9/00* | (2006.01) |
| *G06T 5/00* | (2006.01) |
| *G06T 7/00* | (2006.01) |
| *G06T 3/40* | (2006.01) |

(52) U.S. Cl.
CPC ............ *G06T 5/008* (2013.01); *G06T 3/4038* (2013.01); *G06T 5/003* (2013.01); *G06T 5/009* (2013.01); *G06T 7/0028* (2013.01); *G06T 2200/32* (2013.01); *G06T 2207/10024* (2013.01); *G06T 2207/10032* (2013.01); *G06T 2207/20008* (2013.01); *G06T 2207/20012* (2013.01); *G06T 2207/20208* (2013.01); *G06T 2207/30181* (2013.01)

(58) Field of Classification Search
CPC ............................................ G06T 2207/20008
See application file for complete search history.

(56) References Cited

U.S. PATENT DOCUMENTS

| | | | |
|---|---|---|---|
| 8,861,849 B2 * | 10/2014 | Oicherman | G06T 11/001 382/167 |
| 2003/0090690 A1 * | 5/2003 | Katayama | G06T 5/00 358/1.9 |
| 2006/0222244 A1 * | 10/2006 | Haupt | G06K 9/00295 382/220 |
| 2007/0065044 A1 * | 3/2007 | Park | G06F 17/30247 382/305 |
| 2012/0200702 A1 * | 8/2012 | Wilson | G06T 3/005 348/144 |
| 2014/0029867 A1 * | 1/2014 | Giuffrida | G06T 3/4038 382/284 |

(Continued)

OTHER PUBLICATIONS

Barbot et al ("Automatic and Precise Orthorectification, Coregistration, and Subpixel Correlation of Satellite Images, Application to Ground Deformation Measurments", IEEE Jun. 2007, p. 30).*

*Primary Examiner* — Oneal R Mistry
(74) *Attorney, Agent, or Firm* — Galvin Patent Law LLC; Brian R. Galvin (57) ABSTRACT

A system for automated tonal balancing, comprising a rectification server that groups and processes images for use in tone-matching and provides them to a tone-matching server, that then performs tone-matching operations on the images and provides them as output for review or storage, and methods for tonal balancing using the system of the invention.

1 Claim, 8 Drawing Sheets

(56) References Cited

U.S. PATENT DOCUMENTS

2014/0079322 A1\* 3/2014 Yamaji ............... G06K 9/00536
382/209
2014/0300686 A1\* 10/2014 Campbell .......... H04N 5/23238
348/36

\* cited by examiner

AUTOMATED TONAL BALANCING

CROSS-REFERENCE TO RELATED APPLICATIONS

This application claims the benefit of, and priority to, U.S. provisional patent application Ser. No. 61/990,110, titled "AUTOMATED TONAL BALANCING", filed on May 8, 2014, the entire specification of which is incorporated herein by reference in its entirety.

BACKGROUND OF THE INVENTION

Field of the Art

The disclosure relates to the field of image processing, and more particularly to the field of tonal balancing of ortho-rectified images for the sake of building a mosaic.

Discussion of the State of the Art

In the art, tonal balancing of ortho-rectified images generated from multiple raw source images is a tedious, inefficient and highly manual process. Currently, the practical scalability of existing algorithms (both in terms of computer run-time and resulting tonal consistency across images) drops off substantially after about a dozen or so images.

What is needed is a method of tonal balancing that can balance large numbers of ortho-rectified images automatically as part of a production process. Two types of solution are of interest: In relative tonal balancing, adjacent or overlapping input images are to be tonally balanced to each other. In global base-layer matching, input images are to be tonally matched to a reference base-layer.

SUMMARY OF THE INVENTION

Accordingly, the inventor has conceived and reduced to practice, in a preferred embodiment of the invention, a system and methods for automated tonal balancing that may operate regardless of the scale or quantity of images. For relative tonal balancing, the inventors have developed a way to hierarchically assemble an arbitrarily large number of images, dynamically grouping them based on a set of criteria (discussed below), tonally-balancing the images within a group, and then fusing those images together as a "super-image". This process is then repeated, only now its the super-images are grouped together. This continues until there is a single "final image". This method has been shown to work well using hundreds of images at once, both in terms of balancing quality and running time to complete. For global base-layer matching, the inventors have developed a way of tonally matching the images to a base layer in such a manner that adjacent or overlapping images appear tonally consistent.

According to a preferred embodiment of the invention, a system for automated tonal balancing, comprising: a raw image database computer comprising program code stored in a memory and adapted to store and provide unmodified images and image information to other components of the system; a rectification server computer comprising program code stored in a memory and adapted to analyze and operate on input images to prepare them for tonal balancing, and to provide those images to other components of the system; a tone balancing server computer comprising program code stored in a memory and adapted to perform grouping and tone-balancing operations on sets of input images, and to provide the images and tone-balancing results to other components of the system; and a balanced image database computer comprising program code stored in a memory and adapted to store and provide tone-balanced images and image information to other components of the system, is disclosed.

According to another preferred embodiment of the invention, a method for performing tonal balancing on groups of images, comprising the steps of: receiving, at a rectification server, a plurality of input images; classifying each of the images as an image group; performing, using a tone-balancing server, a grouping and balancing operation on the image groups; updating, using the rectification server, the input images with tone-balancing results; computing, using the tone-balancing server, an alternate tonal balance for remaining images; and providing the resulting balanced images as output, is disclosed.

According to another preferred embodiment of the invention, a method for assembling image groups that are internally tonally-balanced, into larger image groups that are internally tonally-balanced, comprising the steps of: receiving, at a tone-balancing server, a plurality of input image groups, each of which is internally tonally-balanced; selecting an initial image group and making it the charter member of a new group; adding to the new group those input image groups that neighbor the initial group; tonally balancing the images in the new group; and adding the new group to a plurality of output image groups, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

The inventors have conceived, and reduced to practice, in preferred embodiments of the invention, systems and methods for automated tonal balancing that are computationally efficient regardless of the scale or quantity of images, and which produce results of sufficient quality for applications One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 1:
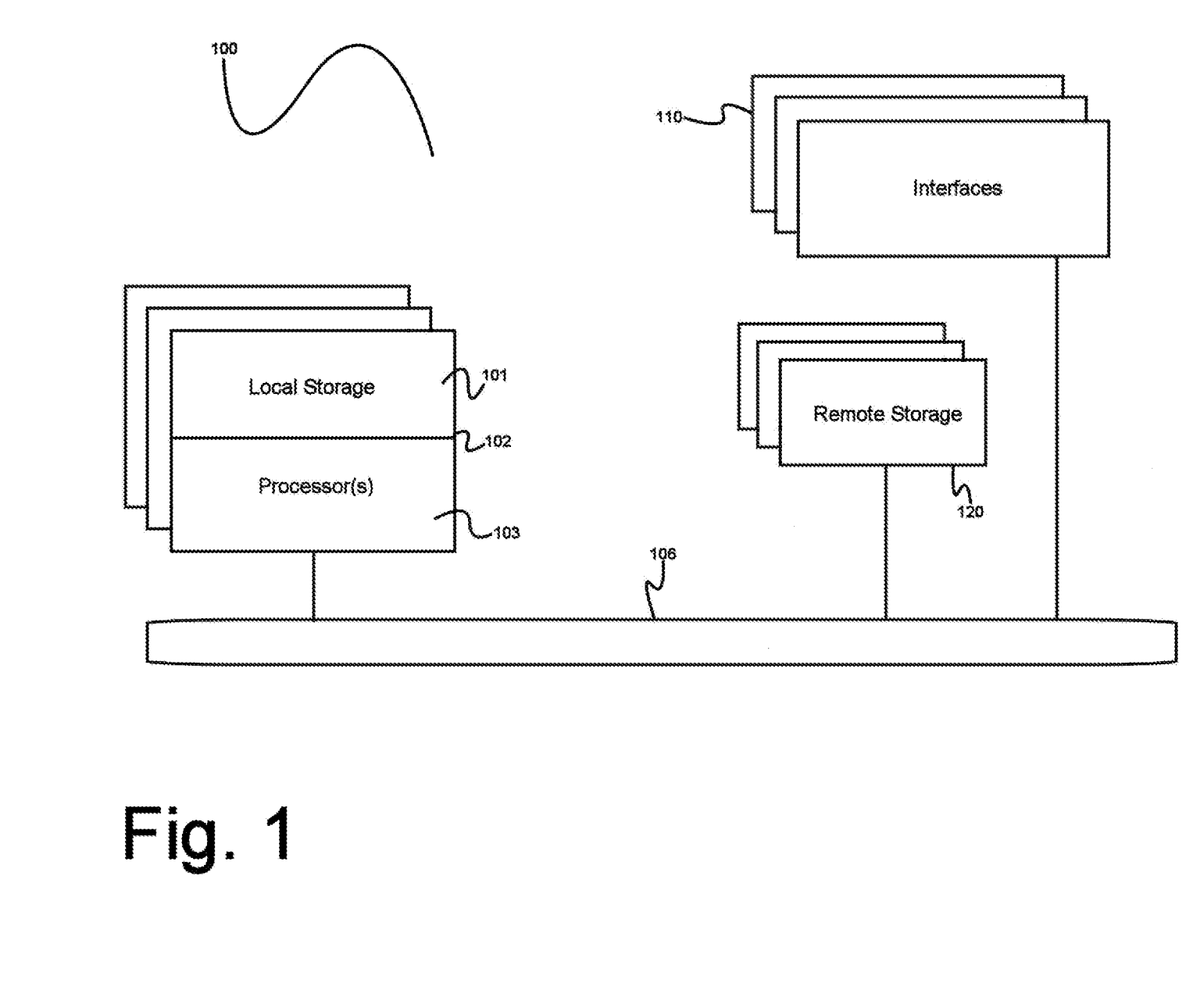
FIG. 1 is a block diagram illustrating an exemplary hardware architecture of a computing device used in an embodiment of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs).

Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine- readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
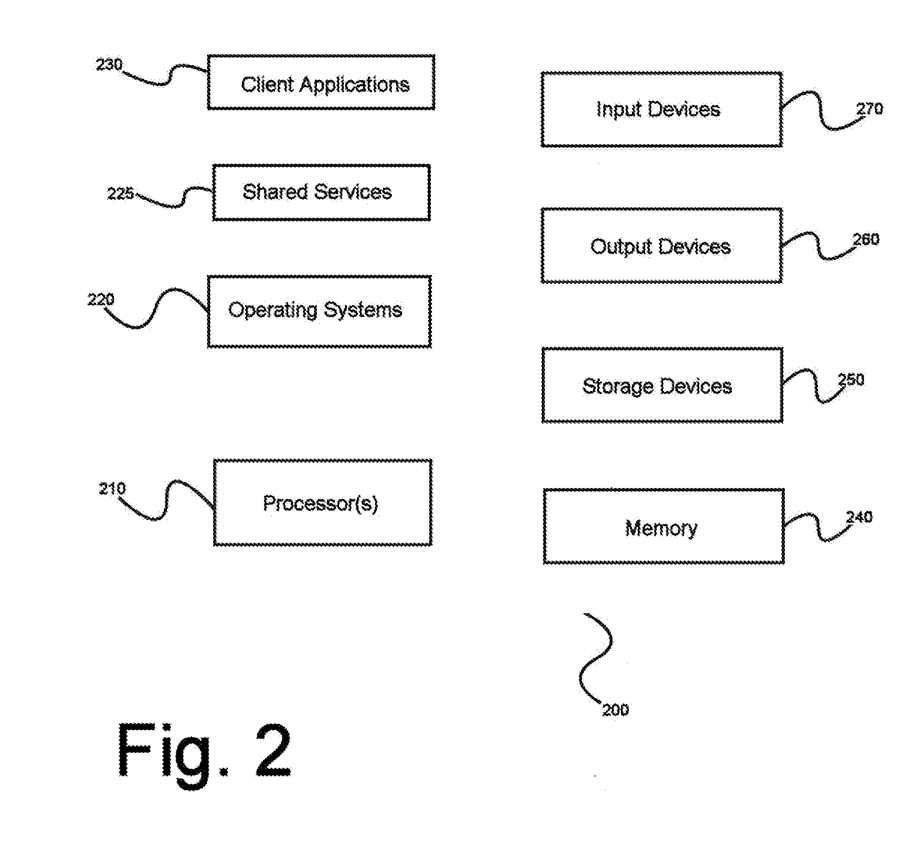
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
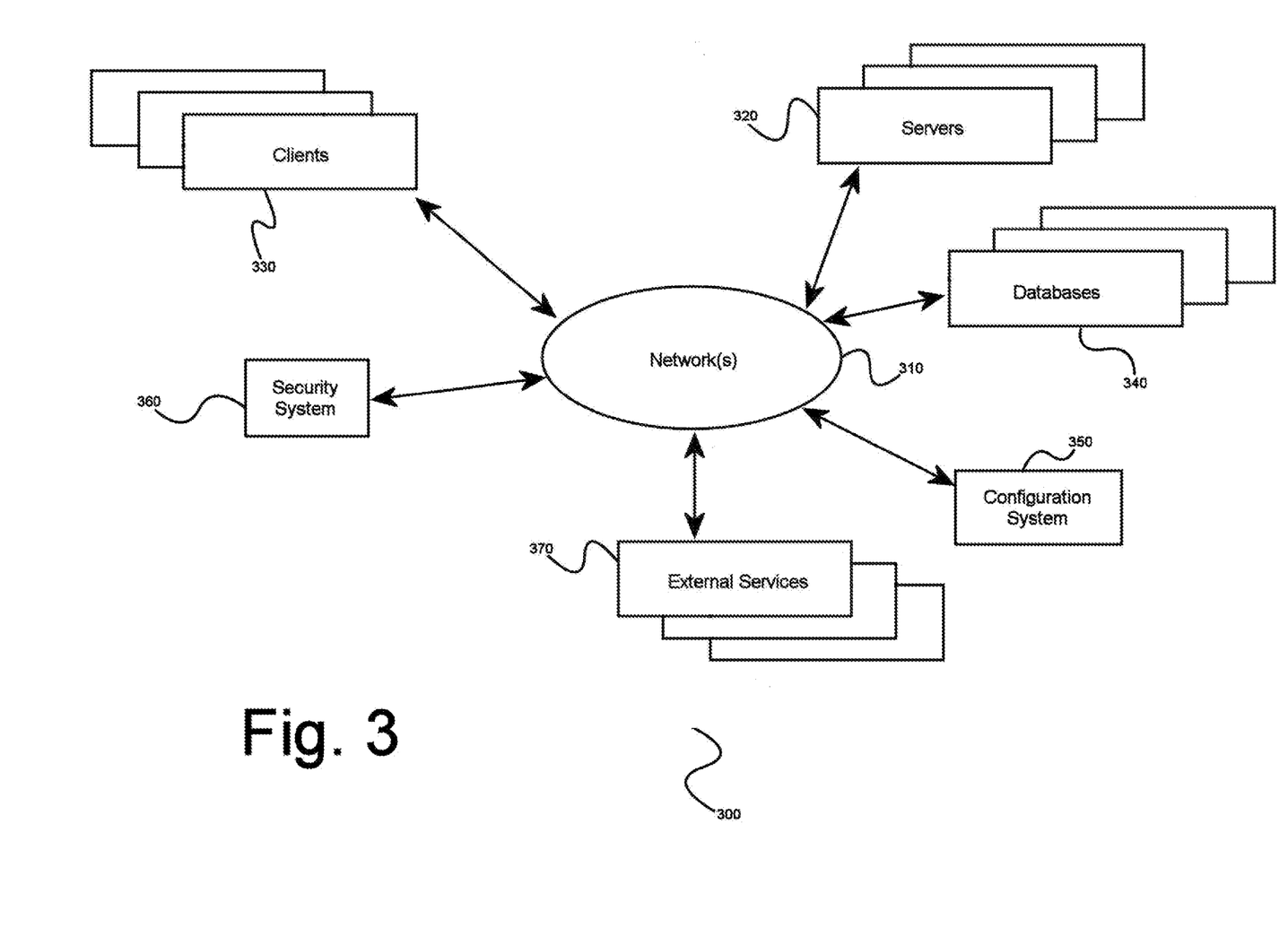
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
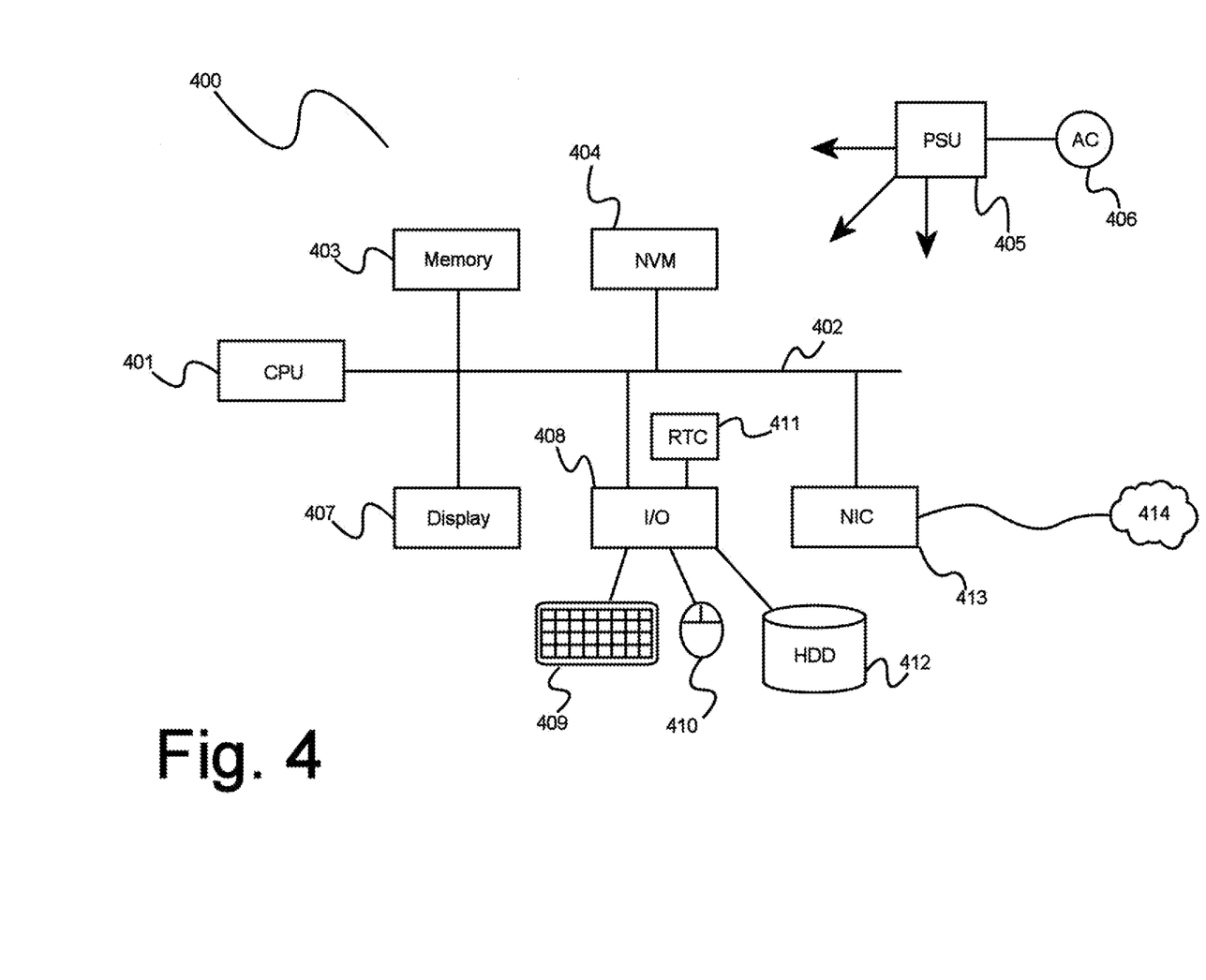
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
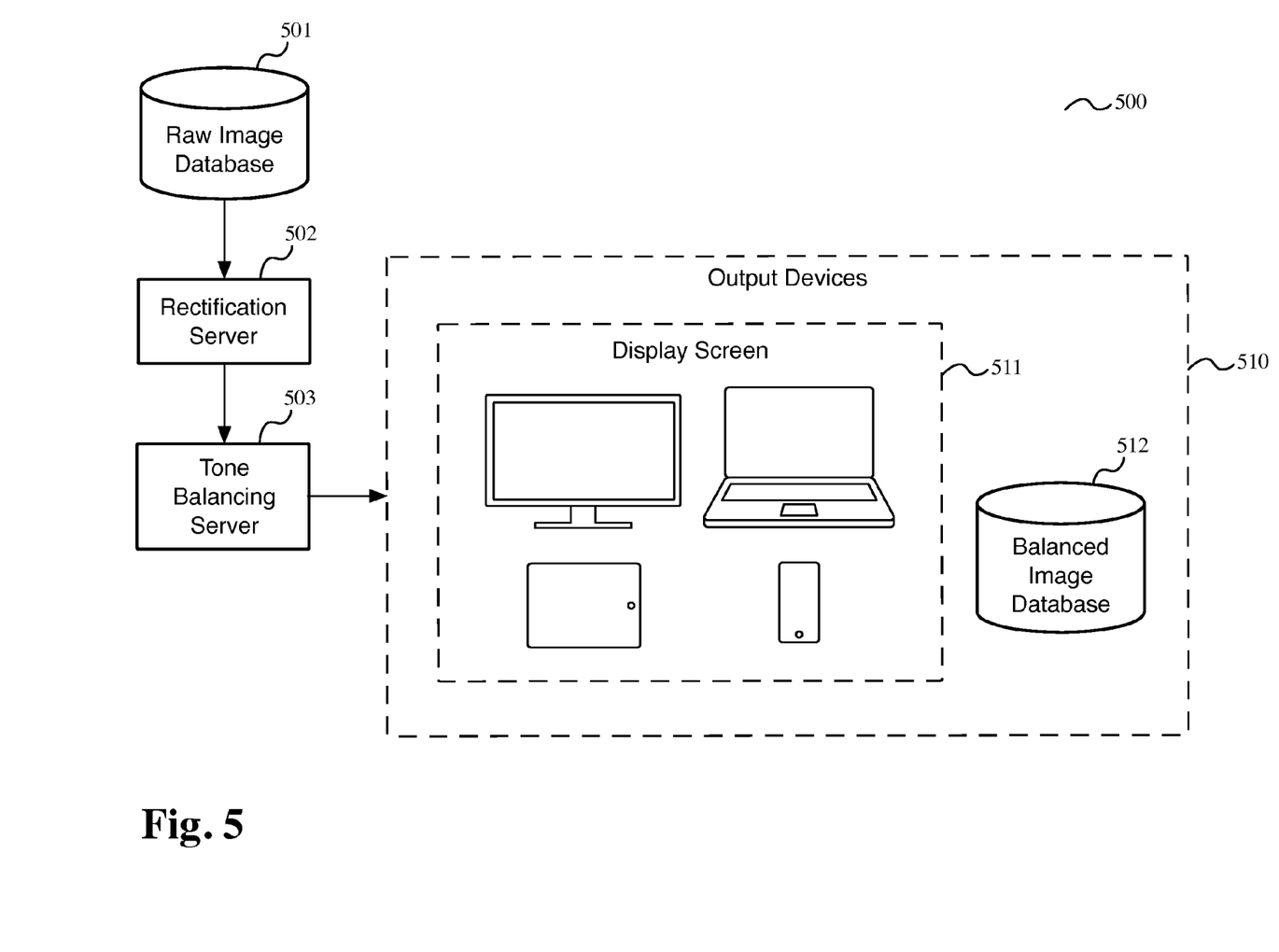
FIG. 5 is a block diagram illustrating an exemplary system architecture for automated tonal balancing, according to a preferred embodiment of the invention.

FIG. 5 is a block diagram illustrating an exemplary system architecture 500 for automated tonal balancing, according to a preferred embodiment of the invention. According to the embodiment, a raw image database 501 may be a computing device comprising program code stored in a memory and adapted to store and provide data to other components of the system 500, and may be connected to or in communication with (such as over a data packet network, or via a direct physical connection, for example) a rectification server 502 that may be a computing device comprising program code stored in a memory and adapted to perform image processing functions according to the invention, such as described below (referring to FIG. 6 and FIG. 7). A tone balancing server 503 may be a computing device comprising program code stored in a memory and adapted to process image data received from a rectification server 502 for tonal correction, such as described below (again, referring to FIGS. 6-7). A system 500 may further comprise a plurality of output devices 510 such as (for example) a display screen 511 that may provide image data for viewing or interaction by a human user, and a balanced image database 512 that may store tonally-balanced images provided by other components of the system 500.

DETAILED DESCRIPTION OF EXEMPLARY EMBODIMENTS

Figure 6:
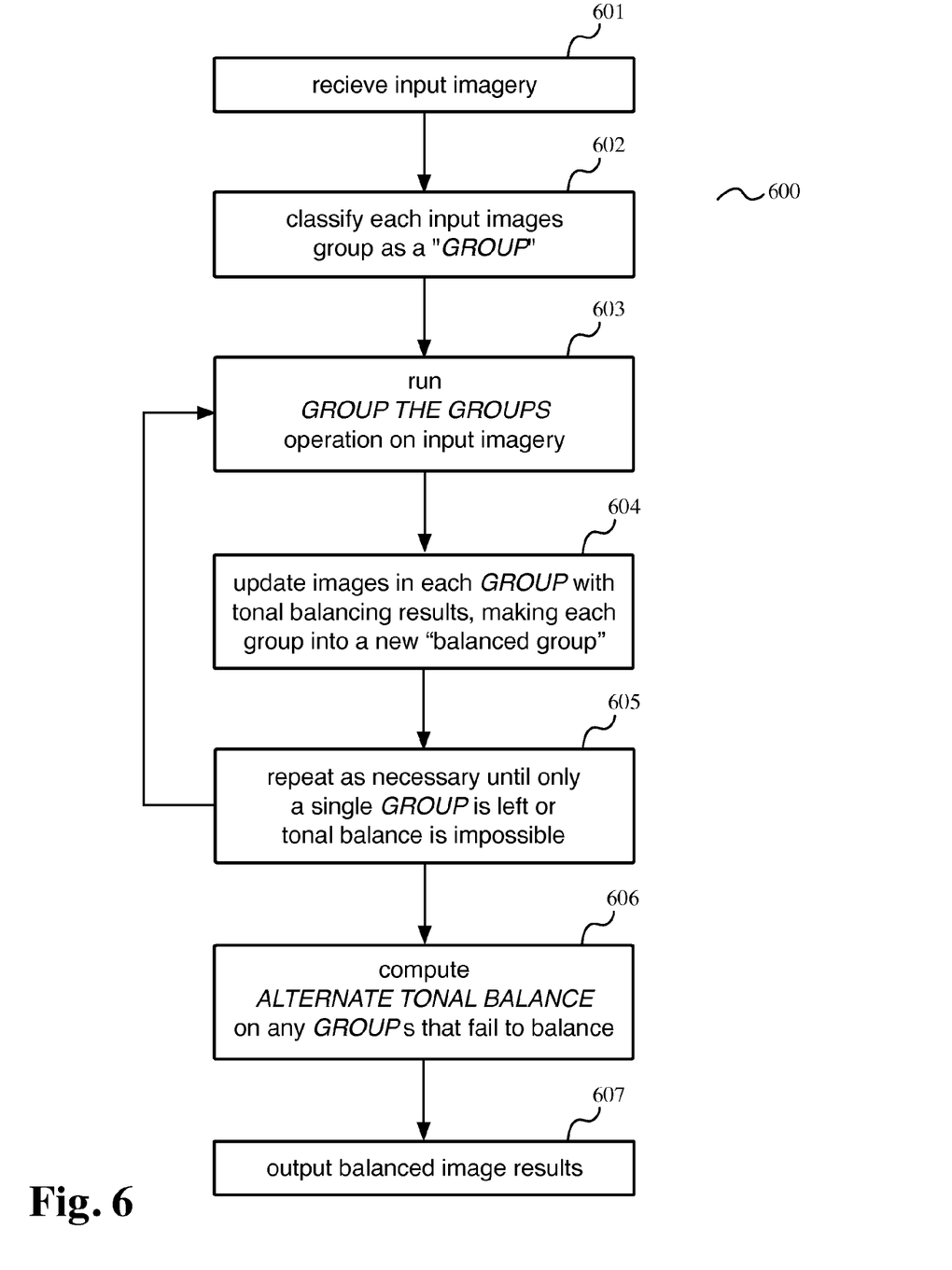
FIG. 6 is a flow diagram illustrating an exemplary method for performing tonal balancing on groups of images, according to a preferred embodiment of the invention.

FIG. 6 is a flow diagram illustrating an exemplary method 600 for performing tonal balancing on groups of images, according to a preferred embodiment of the invention. In an initial step 601, a rectification server may receive input imagery such as from a database or other image source. In a next step 602, the server may initialize the imagery by setting each image as a "group", for later use. In a next step 603, a tone-balancing server may perform tonal balancing on the image groups (which at this point may consist of only individual images), by running a GROUP THE GROUPS operation as described below (referring to FIG. 7). In a next step 604, the output of the operation may then be used by the rectification server to update images in the groups with the tonal-balancing results, producing a set of new, tonally-balanced groups. In a next looping step 605, operation may continue in this fashion as needed (repeating from a previous step 603), until either a single group is left or a plurality of groups remain that cannot be tonally-balanced due to having ill-suited image overlaps to tonally-balance against. In a next step 606, the remaining groups may be processed by the tone-balancing server using an alternate tonal balance operation, and in a final step 607 the results may be output such as for review or interaction by a human user, or for storage such as in a balanced image database.

Figure 7:
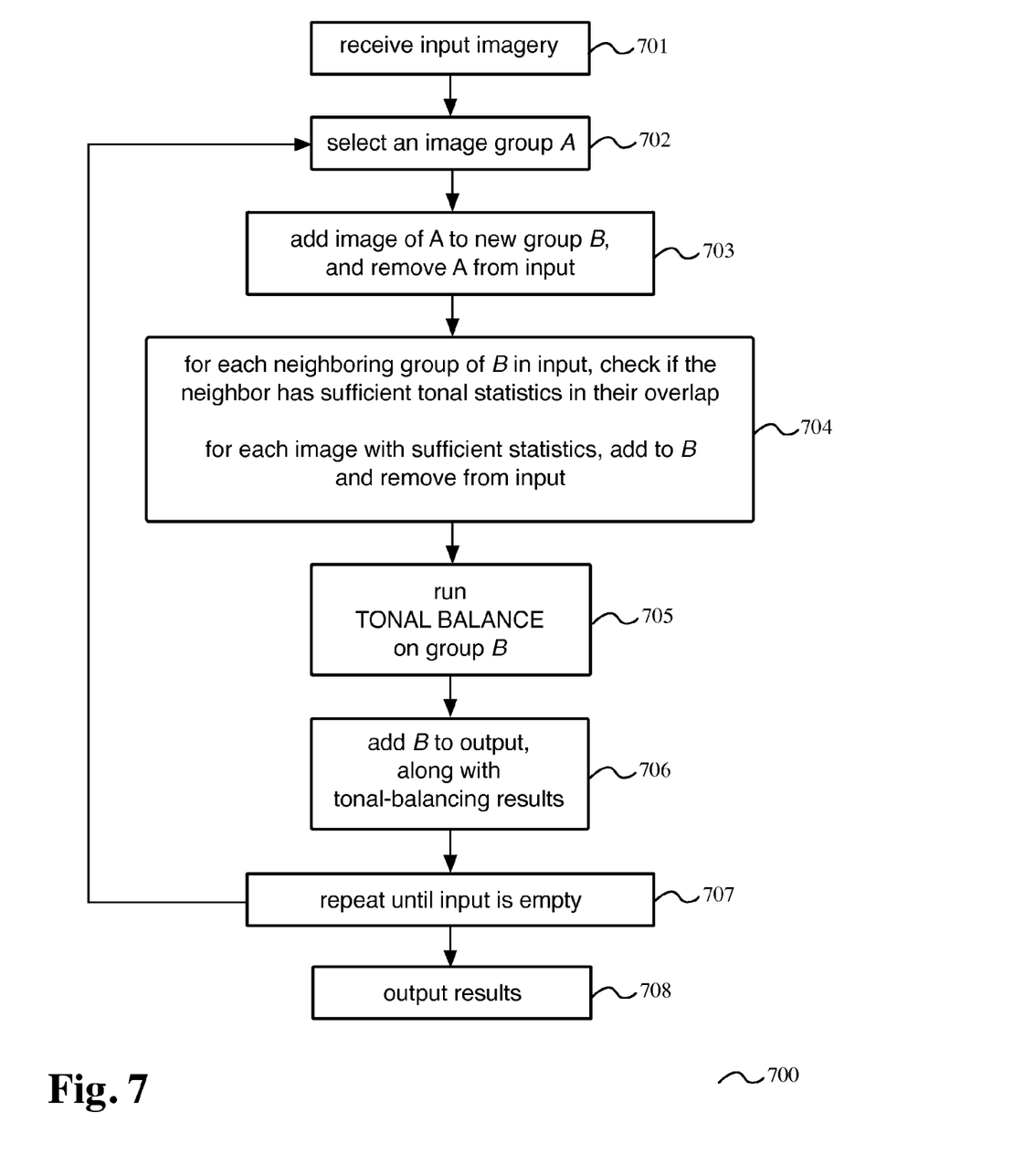
FIG. 7 is a flow diagram illustrating an exemplary method for grouping and balancing images, according to an embodiment of the invention.

FIG. 7 is a flow diagram illustrating an exemplary method 700 for grouping and balancing images, according to an embodiment of the invention. The method illustrated may be used as a GROUP THE GROUPS operation as described previously, for such purposes as a multi-step tonal-matching operation over a plurality of images. In an initial step 701, a tone-balancing server may receive a plurality of input images, and in a next step 702 may select an image group A from the input. In a next step 703, the server may then add the images of A to a new group B, and remove them from the input set. In a next step 704 the server may then examine neighboring groups around A, and if they have overlapping areas deemed to be suitable to tonally-balance, may add those images to B and remove them from the input set. In a next step 705, the server may then run tonal balancing operations on group B. in a next step 706, the server may add B to the output set, along with the results of tonal-balancing. In a next looping step 707, the server may iterate over the rest of the input set as above, grouping images and balancing them in a looping fashion continuing from a prior step 702, and in a final step 708 when input is empty, output the images and tone-balancing results.

In some cases, the overlap between two groups of images may be ill-suited to tonal balancing. In other words, if an overlap doesn't have enough data to give the algorithm described above a good idea of how two groups differ tonally from one another, then the solution generated probably won't be a good match. In such cases, an algorithm referred to above as "ALTERNATIVE TONAL BALANCE" may be used. The ALTERNATIVE TONAL BALANCE algorithm may be one that is specifically designed to better handle such cases mentioned above, and may help alleviate the problem of poor results just described.

Figure 8:
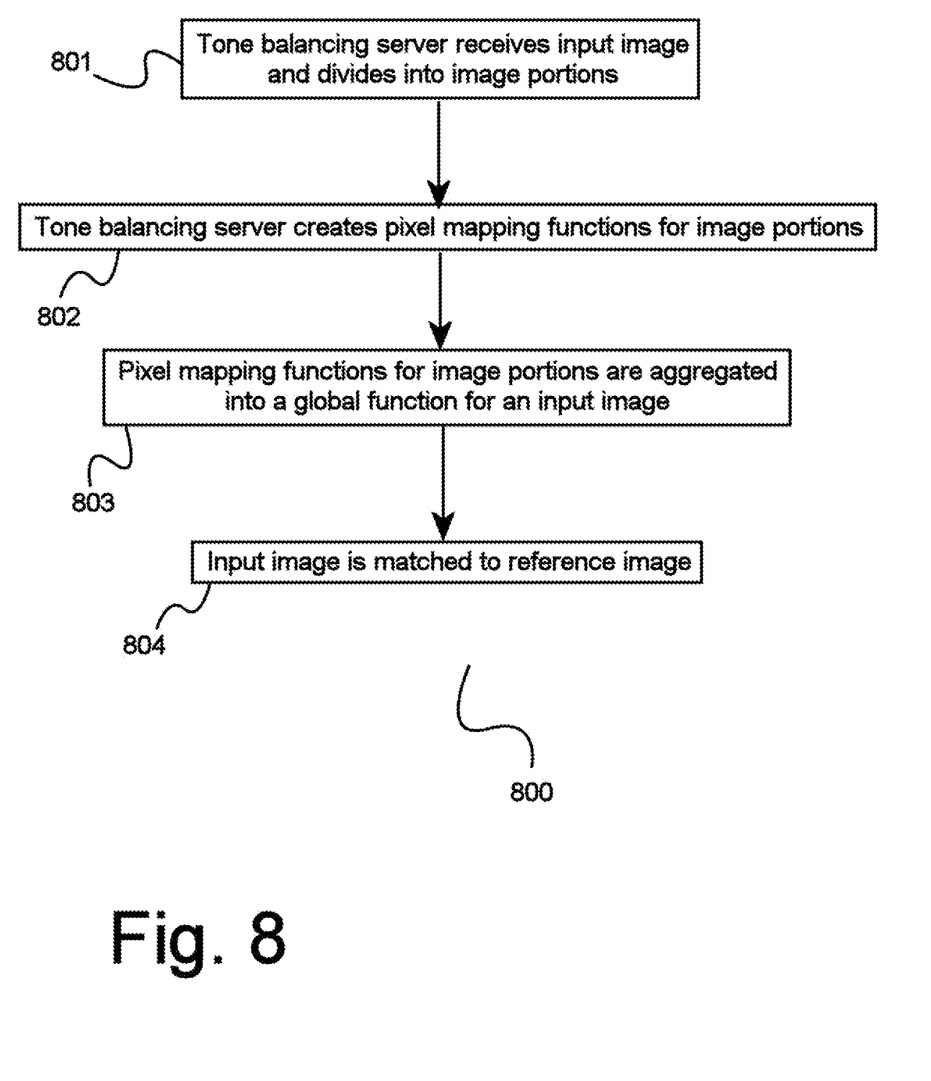
FIG. 8 is a flow diagram illustrating an exemplary local tonal balancing method, according to another embodiment of the invention.

FIG. 8 is a method flow diagram illustrating an exemplary local tonal balancing method 800, according to another embodiment of the invention. According to the embodiment, local tonal balancing may take as input a plurality of imagery and apply functions to the pixels to map the input to that of a reference image that covers a particular area of interest (AOI) for which a mosaic should be produced. In an initial step 801, a tone balancing server may divide an input image (that is, an image portion or slice that requires tonal matching, for example image slices received from a rectification server as described previously with reference to FIG. 5) into smaller portions or image patches (possibly overlapping as needed). Division need not be particularly uniform or disjoint and may generally be guided by input configuration such as image masks to avoid matching or dividing over clouds or water (for example). Then in a next step 802, for each image patch a tone balancing server may create a function that maps the input pixel values (that is, the values of pixels within the initial input image) to output pixel values such that statistics (such as mean value per band or other image statistics) of an output patch match those of a reference image within a corresponding region—for example, such that an output patch corresponding to a city block matches the values of a reference image for that city block, the reference image being an unmodified image of an entire city or other large region encompassing at least the region within an image patch being processed.

In a next step 803, produced functions may then be aggregated into a global function that may be applied to an entire input image, such that the global function creates an output image that closely resembles a reference image. Such aggregation may be done, for example, by interpolation of the individual functions defined within a plurality of image patches defined previously, to create a smooth mapping of input values to output values (such that any seam lines or harsh transitions between patches or images may be minimized, giving the appearance of a continuous smooth transition).

Lastly in a final step 804, each input image may then be matched to a reference image independently of any other input images, facilitating a parallel operation that can process a large number of individual input images efficiently. Since the input images may be matched to the same reference image, the output images will necessarily have very similar tonal qualities such as color, due to aggregation of the input images as described above. This may be used to produce a large image mosaic from a number of input images, where the output mosaic has the appearance of a single image after processing (that is, when the images are "stitched" together) due to the smooth transitions between image portions produced by a local tonal matching process. It should be appreciated that according to the methods described, any original data may be unmodified and preserved, while intermediate updates are accomplished by updating current tonal-balancing scaling values, and updated pixel values are derived on-the-fly. In this way an original copy may be retained for comparison or future use, such as for re-processing using new or updated algorithms, for example.

According to another embodiment, a global base-layer matching process may utilize an available ortho-rectified reference base-layer (for example, low-resolution Landsat 8 imagery) covering an area of interest. Consider two overlapping input images A and B that may comprise at least a portion of the plurality of input images and from which a tonally-balanced ortho-mosaic is to be created. Images A and B may be locally tonally-matched to a base-layer so as to yield good tonal balance with respect to one another. It may be appreciated that such a process may then be generalized to all the input images (that is, the entirety of a plurality of input images of which only a portion may be comprised by images A and B).

Local tonal matching is distinct from global tonal matching as described above, and it should be appreciated that each process may be carried out interchangeably, simultaneously, or in sequence according to a particular arrangement or use. In global tonal matching of an image to a base layer, one (gain, bias)-combination per image band may be prescribed to achieve a histogram match of an entire image band to a corresponding base-layer band (a portion covering the same visual area). In local tonal matching, there is a function f(col, row) per image band that may be used to prescribe a local (gain, bias)-combination to achieve a local histogram match of an image band to a corresponding base-layer band. Image A may be subdivided into rectangular tiles. Where image B does not overlap image A, image B may also be subdivided into tiles. Where image B does overlap image A, image B may adopt image A's tiling. Each tile T of image A may then be matched to a corresponding tile area in the base-layer, and similarly to a previous image overlap process, tiles that overlap may inherit previous subdivided tile portions, and tiles that do not overlap may be subdivided accordingly. Similar overlap-and-inherit operations may be performed for various properties and values, wherein a property for an image B may inherit from a similar property of image A if there is overlap, and may be independently established for image B if there is no overlap.

The skilled person will be aware of a range of possible modifications of the various embodiments described above. Accordingly, the present invention is defined by the claims and their equivalents.

What is claimed is:

1. A method for automatically generating large-scale tonally-balanced orthomosaic images, the method comprising the steps of:
   receiving, at a tone-balancing server computer comprising program code stored in a memory, a plurality of orthorectified input images associated with a geographic region;
   obtaining a reference image for the geographic region;
   for each orthorectified input image, performing the steps of:
      subdividing the orthorectified input image into a plurality of patches;
      computing a pixel-level tonal mapping function for each patch to match a corresponding set of pixels of the reference image;
      computing a first global tonal mapping function for each orthorectified input image by, for each pair of patches of the respective orthorectified input image, computing a function that smoothly connects the respective pixel-level tonal mapping function for the pair of patches; and
      applying the first global tonal mapping function to each pixel of the each orthorectified input image to create a plurality of tonally-balanced orthorectified output image;
   computing a second global tonal mapping reference by smoothly matching each first global tonal matching function for neighboring pairs of orthorectified output images; and
   applying the second global tonal matching function to each pixel of each tonally-balanced orthorectified output image to create a single new, global orthorectified tonally-balanced output image of the geographic region encompassed by the plurality of orthorectified input images.

* * * * *